Dec. 27, 1955   W. W. PRICKETT ET AL   2,728,102
POULTRY SKEWER
Filed Jan. 2, 1953   2 Sheets-Sheet 1

Wilber W. Prickett
Mona E. Prickett
INVENTORS

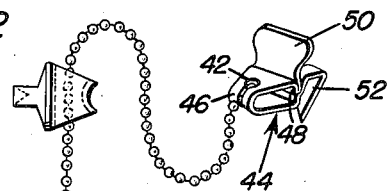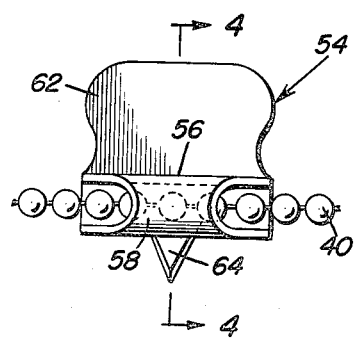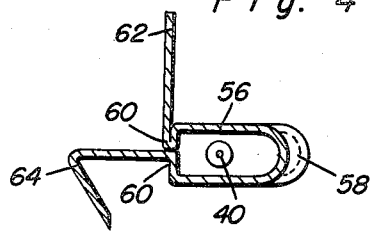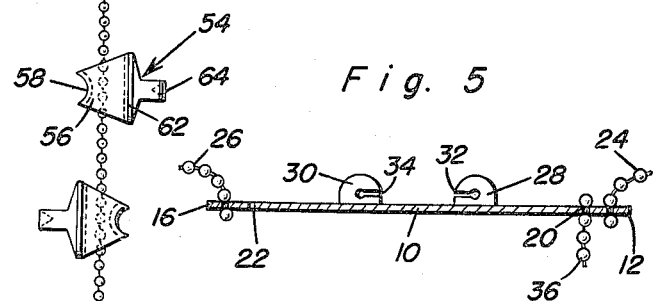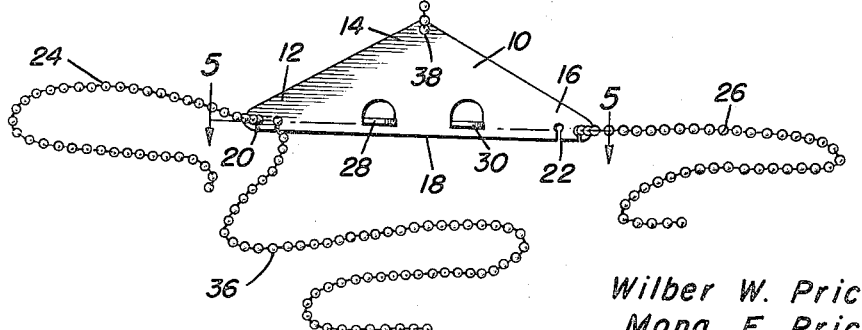

United States Patent Office 2,728,102
Patented Dec. 27, 1955

2,728,102

POULTRY SKEWER

Wilber W. Prickett and Mona E. Prickett, San Diego, Calif.

Application January 2, 1953, Serial No. 329,234

6 Claims. (Cl. 17—11)

This invention relates to new and useful improvements in poultry skewers and the primary object of the present invention is to provide a device for closing a slit or opening made in poultry after stuffing has been placed in the poultry.

Another important object of the present invention is to provide a poultry skewer including a flexible element and novel and improved skin penetrating members through which the flexible element is trained and held taut in order to close an opening in poultry.

A further object of the present invention is to provide a poultry skewer of the aforementioned character wherein the skin penetrating members are each provided with a concavo-convexed web portion so that the flexible element trained back and forth between the skin penetrating members will contact the convex surface of the web portions to retain spaced portions of the flexible element parallel and across a slit or opening in poultry.

A still further aim of the present invention is to provide a poultry skewer that is extremely simple and practical in construction, strong and reliable in use, efficient and durable in operation, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged plan view of the present invention;

Figure 3 is a further enlarged elevational view of one of the skin penetrating members used in the present invention;

Figure 4 is a vertical sectional view taken substantially on the plane of section line 4—4 of Figure 3;

Figure 5 is an enlarged transverse sectional view taken substantially on the plane of section line 5—5 of Figure 2; and, Figure 6 is an enlarged fragmentary perspective view showing the flexible element in the form of a cable.

Figure 1:
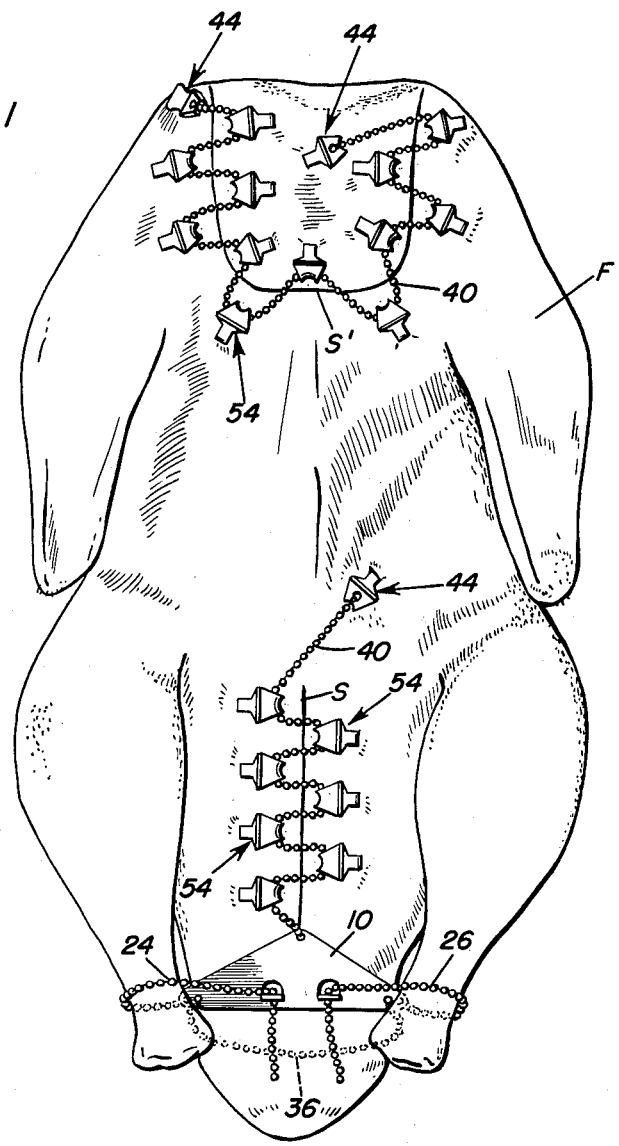
Figure 1 is a plan view of a fowl and showing the present invention secured thereto for closing slits made in the fowl.

Referring now to the drawings in detail, wherein for the purpose of illustration, there is disclosed a preferred embodiment of the present invention, the numeral 10 represents a resilient substantially isosceles triangular base having corners 12, 14, and 16. The base edge 18 of the plate 10 is provided with pairs of end T-shaped slits 20 and 22 which are located at the corners 12 and 16, respectively, as shown best in Figure 2 of the drawings. A pair of end ball-chains 24 and 26 are attached to the base plate 10 and include inner end portions that are placed in the outermost of the slits 20 and 22 to be removably held to the base plate 10. The base plate 10 is of resilient material so that the edges of the slits will yieldingly grip the chains 24 and 26 between selected adjacent balls of the chains. A pair of ears 28 and 30 are struck from the base plate 10 adjacent the base edge 18 and parallel the base edge 18. The ears 28 and 30 are provided with key-shaped slits 32 and 34 whose edges will yieldingly engage the free end portions of the chains 24 and 26 between selected adjacent balls of these chains.

Another ball-chain 36 has its end portions yieldingly gripped by the edges of the innermost slits 20 and 22. The edges of these slits will engage chain 36 between selected adjacent pairs of balls of chain 36.

Corner 14 of base plate 10 is provided with a T-shaped slit 38 that will engage the inner end portions of a further ball-chain 40. The outer end of ball-chain 40 is received in a key shaped slit 42 in a skin piercing member 44. The member 44 is formed from a strip of bendable resilient material and includes a hollow U-shaped body portion 46 in which the slot 42 is provided. The sides of the body portion 46 are bent inwardly to form contacting flanges 48 and the ends of the body portion 46 are bent outwardly from opposite sides of the body portion 46 to form a finger grip 50 and a piercing tongue 52. The piercing tongue 52 is triangular or pointed and its side edges are beveled to pierce the skin of poultry.

A plurality of guide members or skin penetrating members 54 are slidably engaged upon the ball-chain 40. Each of the members 54 is constructed from a strip of bendable resilient material and comprises a U-shaped body 56 having a concavo-convexed web portion 58. The legs of body 56 are bent inwardly to form contacting restrictor flanges 60 that will confine the chain 40 within the body 56. One end of the body 56 is bent outwardly from one side of the body to form a finger grip 62. The other end of the body 56 is bent outwardly from the opposite side of the body 56 and is triangular or pointed to form a skin penetrating tongue 64. The side edges of the tongues 64 of each of the members 54 are beveled to cut into the skin of poultry.

Figure 6:
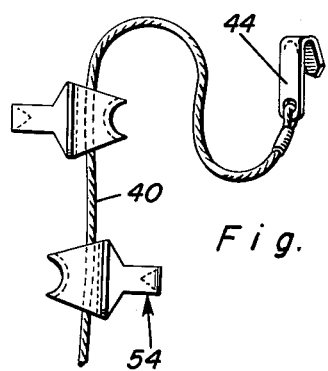

Figure 6 shows the ball-chain 40 replaced by a cord or cable 40a engaged by a plurality of skin penetrating members 54a. One end of the cable 40a is suitably attached to the base plate 10 and the other end of the cable 40a is secured to a hook 44a that will penetrate the skin of a fowl or poultry.

Figure 1 shows the present invention used for closing a slit S in a fowl F. Members 54 are disposed along side the slit S with alternate members being located on the opposite sides of the slit S. The base plate 10 is held relative to the fowl F by chains 24 which are engaged about the legs of the fowl and chain 36 which is engaged about the rear end of the fowl. The chain 40 is pulled away from the base plate 10 so that the members 54 on one side of the slit S will be moved toward the members 54 on the other side of the slit after which the piercing member 44 is engaged in the skin of the fowl to hold the chain 40 taut and the slit S closed.

A slit S' in the fowl F may be closed by a ball-chain 40b similar to the ball-chain 40 and having a plurality of the skin penetrating members 54b engaged thereon. A pair of the piercing members 44b are engaged with the ends of the ball-chain 40b. Alternate members 54b are disposed on one side of the slit S' with the other members located on the opposite side of the slit S'. After the members 54b have been engaged with the skin of the fowl, the chain 40b is pulled tightly and the skin piercing members 44b engage with the skin of the fowl to hold the slit S' closed. The member 40b may be replaced by a cable such as 40a.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A poultry skewer comprising a triangular base plate, a plurality of flexible elements removably attached to the apices of the triangular base plate, each of said flexible elements having a free end portion, securing means forming part of said base plate engageable with the free end portions of the flexible elements secured at opposite corners of said triangular base plate for securing said base plate about the lower extremities of the legs and tail portion of a fowl being prepared, a plurality of skin penetrating members slidably carried by the flexible element secured at the other corner of said triangular plate, each of said penetrating members including a channel-shaped body having inturned contacting flanges at its ends, a finger grip integral with one of said flanges and projecting laterally from one side of the body and a penetrating prong integral with the other of said flanges and projecting outwardly from the other side of said body, and an anchoring member secured on the free end of the flexible element on the other corner of said base plate, said anchor member including a portion penetrable into a fowl being prepared.

2. The combination of claim 1 wherein said means carried by the base plate for retaining the same relative to poultry comprising a plurality of ball-chains, said base plate having slits in which said ball-chains are engaged, and ears struck from said base plate having slits engaging the ball-chains.

3. The combination of claim 1 wherein said anchoring member comprises a hollow body having a slit therein, said flexible element being engaged with said body through said slit, a finger grip portion integral with and projecting outwardly from one side of the body, and a pointer tongue integral with and projecting outwardly from the other side of the body for penetrating the fowl.

4. A poultry skewer comprising a ball-chain, skin piercing members attached to the ends of the ball-chain, and a plurality of skin penetrating members slidably engaging the ball-chain.

5. The combination of claim 4 wherein said skin piercing members comprise hollow bodies each having a key shaped opening to receive a part of the ball-chain between two balls of the ball chain.

6. The combination of claim 5 wherein each of said bodies includes a concavo-convexed web portion, said ball-chain engaging the convex surfaces of said web portions.

References Cited in the file of this patent

UNITED STATES PATENTS

| | | |
|---|---|---|
| 1,070,797 | Gordon | Aug. 19, 1913 |
| 1,091,085 | Roucher | Mar. 24, 1914 |
| 1,254,206 | Cull | Jan. 22, 1918 |
| 1,494,233 | Fudge | May 13, 1924 |
| 1,633,499 | Selden | June 21, 1927 |
| 2,189,421 | Huschka | Feb. 6, 1940 |
| 2,583,913 | Weiterschan | Jan. 29, 1952 |